United States Patent [19]
Hodgson et al

[11] 3,892,979
[45] July 1, 1975

[54] TUNABLE INFRA RED/ULTRAVIOLET LASER

[75] Inventors: Rodney T. Hodgson, Somers; John R. Lankard, Mahopac; Peter P. Sorokin, White Plains; James J. Wynne, Montrose, all of N.Y.

[73] Assignee: International Business Machines Corporation, Armonk, N.Y.

[22] Filed: Apr. 5, 1974

[21] Appl. No.: 458,144

Related U.S. Application Data

[62] Division of Ser. No. 343,307, March 21, 1973, Pat. No. 3,816,754.

[52] U.S. Cl. .............................. 307/88.3; 321/69 R
[51] Int. Cl. ............................................. H02m 5/04
[58] Field of Search ................... 307/88.3; 321/69 R

[56] References Cited
UNITED STATES PATENTS

| | | | |
|---|---|---|---|
| 3,371,265 | 2/1968 | Woodbury et al. | 307/88.3 X |
| 3,795,819 | 3/1974 | Harris | 307/88.3 |

*Primary Examiner*—R. V. Rolinec
*Assistant Examiner*—Darwin R. Hostetter
*Attorney, Agent, or Firm*—George Baron

[57] ABSTRACT

An infrared source producing a coherent output having a spectrally narrow and continuously tunable frequency is described. Such a source uses a four wave mixing process in an alkali metal vapor, wherein the initial input beams to the alkali metal vapor come from two dye lasers. In an alternative mode of operation, tunable ultraviolet output is obtained.

4 Claims, 5 Drawing Figures

FIG. 4
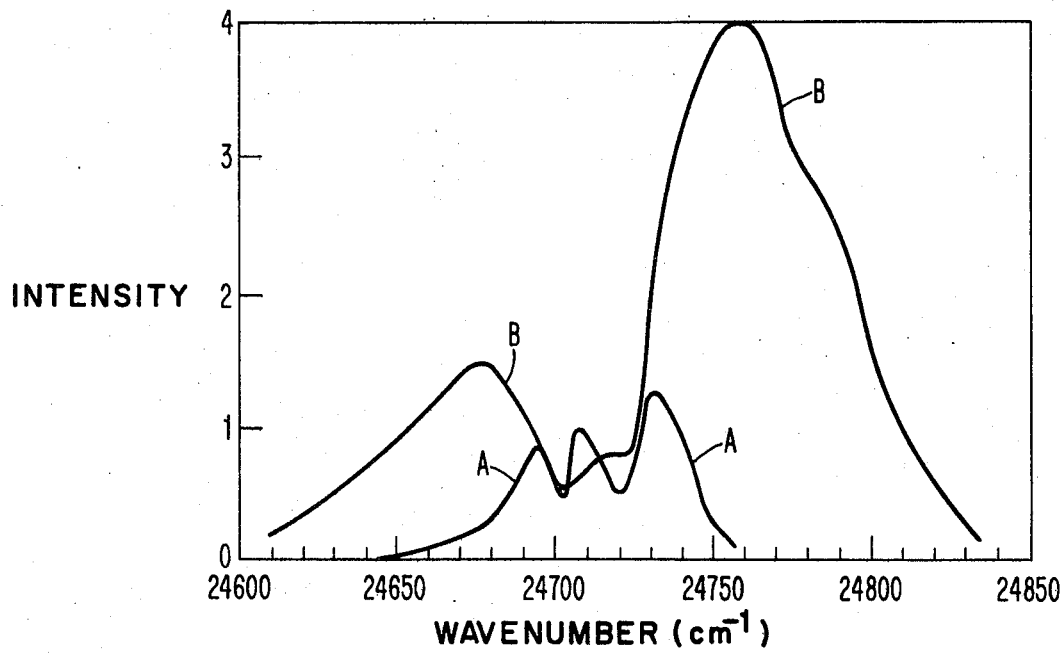
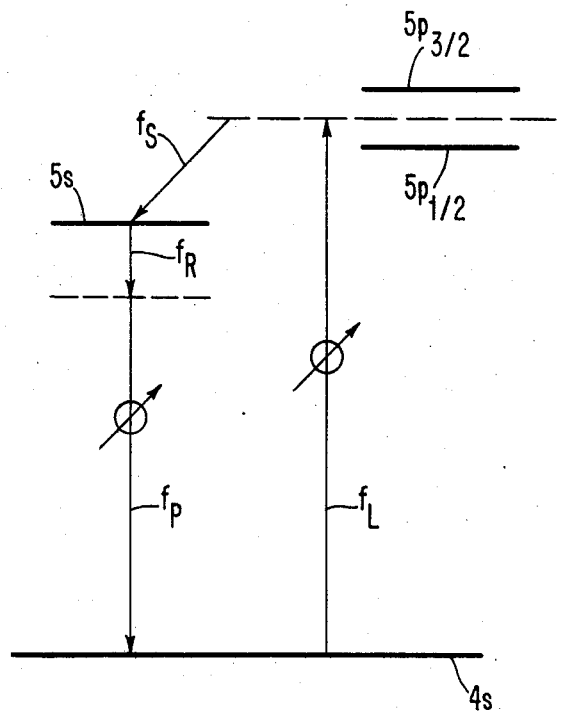
FIG. 3

TUNABLE INFRA RED/ULTRAVIOLET LASER

This is a division of application Ser. No. 343,307 filed Mar. 21, 1973, now U.S. Pat. No. 3,816,754.

BACKGROUND OF THE INVENTION

Infrared sources have wide use in the field of spectroscopy, commuincations, controlled heating processes, medical treatment and/or diagnostics, etc. However, most sources are of a fixed frequency, greatly limiting their application save for one or two specific technologies. Tuned sources, particularly over a wide range, are highly desirable in that they can be used for diversified applications. However, known available tuned sources are either limited in their range, power or reliability. For example, there is a class of semiconductor lasers, of which the lead chalcogenides (PbSe, PbS, etc.) are the most likely candidates. However, such materials need to be maintained at liquid nitrogen temperatures and their tunability is not very practical, relying on a change in composition of the lead chalcogenide compound.

Another known tunable laser is the spin-flip Raman laser, also operative at low temperatures, wherein a semiconductor is placed in a magnetic field while a $CO_2$ laser, emitting at a frequency of about $10\mu$, impinges on the semiconductor. Variation of the magnetic field will tune the spin-flip Raman laser between 11 and $13\mu$. For a CO laser impinging on the semiconductor, slight tuning around $6\mu$ takes place. Yet another type of tunable source comprises a dye laser and a ruby laser impinging on a $LiNbO_3$ crystal and the difference frequency mixing of the two lasers in the crystal permits a frequency tuning between $3-4.5\mu$.

The presently available infrared sources are either incoherent or, if they are coherent, tend to be tunable within a very narrow range of frequencies.

The most versatile tunable coherent ultraviolet source now in existence is comprised of a tunable dye laser and a nonlinear acentric crystal which generates the second harmonic of the dye laser. However, this method has a short wavelength limit which is in the neighborhood of $\approx 2500$ A. for the best available nonlinear crystals. The device described herein has no such short wavelength limitation.

SUMMARY OF THE INVENTION

The infrared/ultraviolet source to be described hereinafter in detail comprises two tunable dye lasers wherein one is made to emit at a first frequency $f_L$, called the pump frequency, and the other emits a second frequency $f_P$. The two output beams $f_L$ and $f_P$ are combined by mirrors or prisms into a colinear beam the latter being focused into a heat-pipe oven containing an alkali metal vapor. The primary pump frequency $f_L$ creates a third frequency $f_S$ in the vapor via the electronic stimulated Raman effect. Frequency $f_P$ mixes with $f_S$ and $f_L$ to produce $f_R$, where $f_R = f_L - f_S \pm f_P$. Since $f_L - f_S$ equals a constant, K, the produced frequency $f_R = K \pm f_P$. Since the difference $K - f_P$ can easily be made quite small, a tuning range extending into the far infrared is practicable. The sum $K + f_P$ extends the tuning range to higher frequencies, into the ultraviolet.

BRIEF DESCRIPTION OF THE DRAWINGS

FIG. 3 is an energy level diagram depicting a four-wave parametric mixing process producing tunable infrared radiation in a potassium vapor cell.

FIG. 4 is a plot of the intensity variation of stimulated Raman Stokes emission from potassium as a function of pump frequency for two different pressures of the potassium vapor.

DESCRIPTION OF THE PREFERRED EMBODIMENTS

Figure 1:
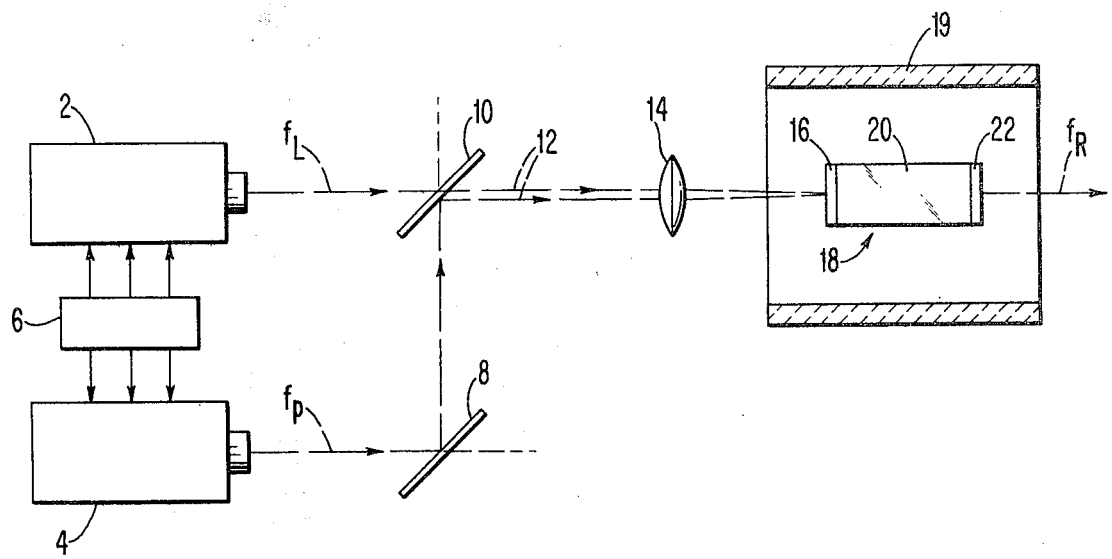
FIG. 1 is a schematic showing the preferred embodiment of the invention.

Seen in FIG. 1 are two dye lasers 2 and 4. Both dye lasers 2 and 4 can be optically pumped by the same source, such as nitrogen laser 6. Both lasers 2 and 4 could be flashlamp-pumped dye lasers with time synchronized outputs. Both lasers 2 and 4 are frequency tunable, and the frequency emitted by laser 2 is $f_L$, referred to hereinafter as the pump frequency, and that of laser 4 is $f_P$. A pair of mirrors 8 and 10, or Glan prisms, or equivalent optical elements, are used to form a colinear beam 12 containing the two frequencies $f_L$ and $f_P$. A lens 14 focuses the colinear beam 12 through the window 16 into a heat-pipe oven 18 containing alkali metal vapor 20. Lithium, sodium, potassium, cesium and rubidium are vaporized metals substitutable for one another in the heat-pipe oven. For each alkali metal vapor, specific dye solutions for lasers 2 and 4 are chosen so as to be appropriate for that material. Window 16 is chosen to be transparent to the frequencies $f_L$ and $f_P$. Cell 18 is maintained by its surrounding oven 19 at a temperature sufficient to maintain the alkali metal vapor pressure at several torr. At the end of the cell 18 is placed a filter 22 transparent to infrared radiation from 2-200 microns or transparent to ultraviolet radiation in the second mode of operation to be described below.

Figure 2:
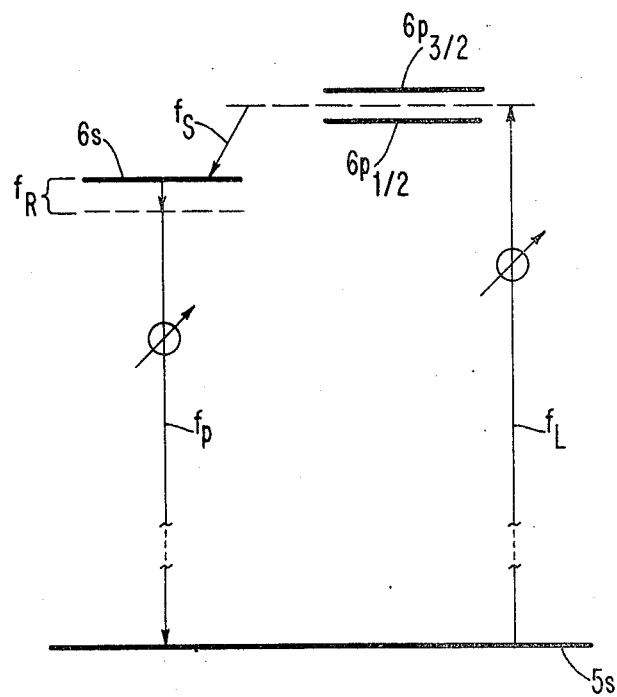
FIG. 2 is an energy level diagram depicting a four-wave parametric mixing process producing tunable infrared radiation using a rubidium vapor cell.

FIG. 2 will now be discussed in conjunction with FIG. 1 in order to describe the operation of a novel infrared source. Cell 18 is filled with rubidium as a specific alkali metal vapor 20. For rubidium, cell 18 is maintained at a temperature between 400°-500°C in order to maintain the rubidium vapor pressure between 2-20 Torr. The energy level diagram for rubidium is depicted in FIG. 2. The 5s to 6p resonance lines occur at 4202 and 4216 A., corresponding to a difference of 78 $cm^{-1}$. Nitrogen-laser-pumped dye laser 2 is tuned, using a diffraction grating or other conventional frequency selective device, not shown, to the region near the two resonance lines $6p_{3/2}$ and $6p_{1/2}$. The dye for laser 2 can be a toluene solution of bis MSB. At the same time that laser 2 is pumped by nitrogen laser 6, laser 4 is also pumped by laser 6 and emits at $f_P$. The beams from lasers 2 and 4 are combined and made to pass as a colinear beam 12 into cell 18 containing rubidium. If the intensity at the frequency $f_L$ is sufficiently high, stimulated Raman scattering (SRS) will occur in the rubidium vapor 20, producing a beam at a frequency $f_S$. The threshold for the SRS process is significantly lowered by the near resonance of $f_L$ with the 6p states, an advantage that arises when the pump laser 2 can be tuned near such states. The SRS occurs to the 6s state with $f_S \approx 3660$ $cm^{-1}$ and $\lambda_S \approx 2.73\mu$.

The three waves having the frequencies $f_L$, $f_S$, and $f_P$, respectively, will generate a nonlinear polarization at a fourth frequency $f_R$ and cause a beam at that frequency to be radiated. Since $f_R$ is equal to $E(6s)/h - f_P$, where $E(6s)$ is the energy difference between the $6s$ state and the $5s$ ground state, and $h$ is Planck's constant, and since $f_P$ is tunable over 1500 cm$^{-1}$ or so for a given dye solution in dye laser 4, the fourth wave will be tunable over a 1500 cm$^{-1}$ range in the infrared. For example, the region between $2.5\mu$ (4000 cm$^{-1}$) and $4\mu$ (2500 cm$^{-1}$) can be covered with one dye solution in laser 4. Any other region of the infrared having approximately the same spectral range (width) can be covered by using a different dye in laser 4.

A feature of this invention which contributes to its efficiency is its large, resonantly enhanced third-order nonlinear coefficient, $\chi$. The expression for $\chi$ contains frequency dependent resonant denominators made up of factors whose real parts are $(f_{6p} - f_L)$, $(f_{6s} - f_L + f_S)$ and $(f_{6p} - f_L + f_S + f_P)$, wherein $f_{6s} = E(6s)/h$ and $f_{6p} = E(6p)/h$. The first of these is close to zero and the second is identically zero, thus providing a large resonant enhancement of $\chi$.

Another feature which contributes to the efficiency is a long coherence length, $L_c$, which is given by the expression $$L_c = \frac{1}{2\left(\frac{\Delta n_R}{\lambda_R} + \frac{\Delta n_S}{\lambda_S} + \frac{\Delta n_P}{\lambda_P} - \frac{\Delta n_L}{\lambda_L}\right)} \quad (1)$$

where $\Delta n_i = n_i - 1$, and $n_i$ is the index of refraction at wavelength $\lambda_i$. The amount of parametrically generated power at $f_R$ is reduced by a factor $(L_c/L)^2$ from its theoretical maximum, the latter being expressed by the relationship $$I_R = K\chi^2 L^2 I_L I_S I_P \quad (2)$$

where $K$ is a constant, $L$ is the length of the vapor 20 in cell 18, and $\chi$ is the third-order nonlinearity of the vapor. There are at least two ways to maximize $L_c$. Firstly, one can achieve that object by adjusting the frequency $f_L$. Referring to Eq. (1) the denominator can be adjusted to equal zero by slight adjustment of the frequency $f_L$. A significant contribution to $\Delta n_L$ is made by the $6p$ resonance lines as a result of their proximity to $f_L$. Thus one can vary $f_L$, thereby changing $\Delta n_L$ in order to set the denominator equal to zero. This is known as phase-matching.

$L_c$ can also be made large by the addition to cell 18 of variable amounts of another alkali metal vapor (sodium, potassium, or cesium). Such additional vapor affects the index of refraction of the four waves primarily through the two principle resonance lines of the vapor (e.g., the 5896 A and 5890 A lines of sodium). This serves to "bias" the device so that phase-matching can be achieved with $f_L$ adjusted to a setting where the Raman power is high (see FIG. 3). In order to generate $f_R$ in different regions of the infrared, the "bias" may be changed, keeping $f_L$ at its optimum position for Raman emission. Arbitrary mixtures of two alkali metal vapors can be conveniently realized in a concentric heat-pipe oven.

As can be seen, the variable frequency $f_P$ of laser 4 determines the infrared output frequency $f_R$, while the variable frequency $f_L$ of laser 2, or the variable vapor mixture, or both, provides an amplitude trim control by maximizing the coherence length $L_c$ for a given frequency setting $f_P$. If there is a change in coherence length during the duration of the laser pulse due to the $6s$ state being significantly populated in the vapor in cell 18, then $f_L$ can be empirically adjusted to give a maximum coherence length at the peak of the pulse.

With potassium vapor substituted for rubidium vapor 20 in the heat-pipe oven 18, the appropriate energy level diagram is shown in FIG. 3. The $4s$ to $5p$ resonance lines occur at 4044 and 4047 A., corresponding to a difference of 18.76 cm$^{-1}$. If the nitrogen-laser-pumped dye laser 2 is tuned to lie near these lines, then SRS occurs to the $5s$ state with $f_S \approx 3690$ cm$^{-1}$ and $\lambda_S \approx 2.7\mu$. When working with potassium as the alkali metal vapor, the dye for laser 2 can be an ethanol solution of 2-hydroxy-4-methyl-7-aminoquiline.

The use of alkali metal vapors has been found to be exceedingly useful in obtaining high tunability in that the vapor is highly transmissive to the infrared being generated. Also the inversion symmetry of the system does not prohibit nonlinear mixing at the third order, whereas second order mixing requires an acentric crystal. The final beam, having a frequency in the infrared region, is phase matched with the nonlinear polarization of the vapor that is generating such infrared radiation, using the normal dispersion of the vapor or that of the vapor and the second added "biasing" vapor, as mentioned above.

Another aspect of this invention allows for tunability of the frequency $f_S$. If one uses a powerful laser source to generate $f_L$, and if $p$ levels higher than $5p$ can be reached, the result will be a series of moderately wide spectral regions over which $f_S$ can be tuned. Thus, the invention also contemplates tuning using tunable SRS as well as a four-wave parametric conversion. It is understood, of course, that the four-wave parametric conversion yields greater tunability than the SRS conversion.

Stimulated electronic Raman emission is a contributing factor in the four-wave parametric conversion in alkali metal vapors. FIG. 4 diagrammatically illustrates how such Raman emission varies with $f_L$ and with the pressure of the potassium vapor in cell 18, when such pressure is varied from 0.5–20 Torr and when the peak power of the beam with frequency $f_L$ exceeded 100 watts. Curve A of FIG. 4 shows measured variations in the intensity of the Raman Stokes beam at $f_S$ at a low pressure as a function of $f_L$, for example, near 0.5 Torr. The value of $f_S \approx 3700$ cm$^{-1}$ ($\lambda_S \approx 2.7\mu$). Curve B of FIG. 4 shows the same measured variations in Raman Stokes intensity when the vapor pressure of the potassium is nearer 20 Torr. Increased vapor pressures of potassium did not substantially change the shape of curve B.

Figure 5:
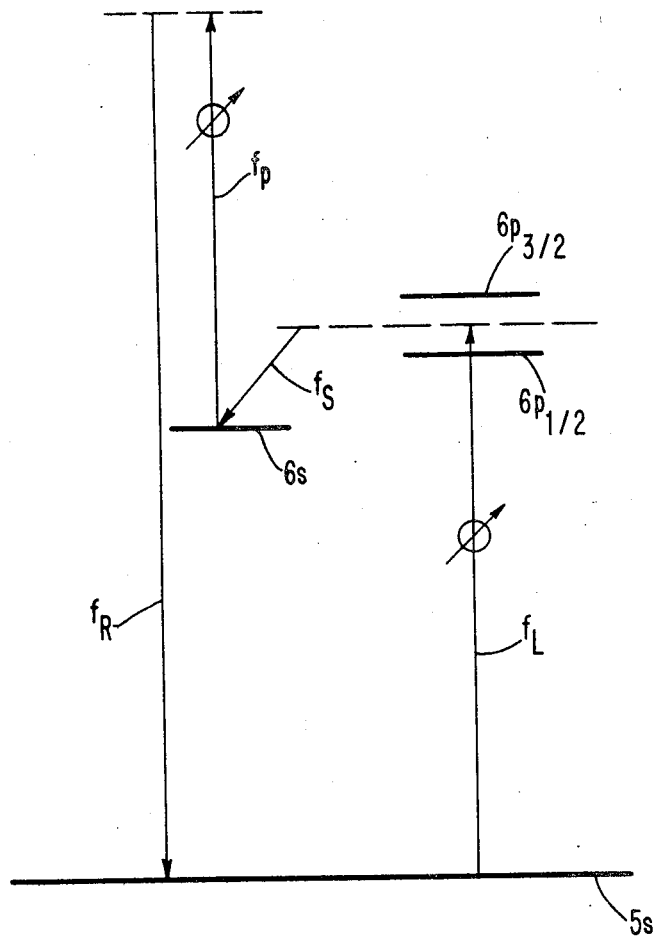
FIG. 5 is an energy level diagram depicting a four-wave parametric mixing process producing tunable ultraviolet radiation in a rubidium vapor cell.

Thus far a mode of operation producing widely tunable infrared output has been stressed. An alternative four-wave mixing process that produces widely tunable ultraviolet output is indicated in FIG. 5, which shows the energy level diagram for rubidium. The lasers 2 and 4 are actually the same as used in the process of FIG. 2. The nonlinear susceptibility, $\chi$, is resonantly enhanced in the same way as discussed above. In order to strongly enhance the production of ultraviolet radiation at the expense of infrared radiation, the former process must be phase matched. In general only one of the two processes will be phase matched and that process will dominate. The coherence length for the process shown in FIG. 5 is given by $$L_c = \frac{1}{2\left(\frac{\Delta n_R}{\lambda_R} + \frac{\Delta n_S}{\lambda_S} - \frac{\Delta n_P}{\lambda_P} - \frac{\Delta n_L}{\lambda_L}\right)} \quad (3)$$

instead of by Eq. (1) which applies to the process shown in FIG. 2. The difference is in the sign of the term $\Delta n_P/\lambda_P$ in the denominator. In phase matching by adjusting $f_L$, different values of $f_L$ will be required to set the denominator equal to zero in the two cases. As in the case of efficient infrared production, $f_L$ should also be set to favor strong production of SRS, i.e., $f_L$ should be set to correspond to one of the peaks in FIG. 4. If this is incompatible with phase matching in pure rubidium vapor, a second alkali metal vapor may be admitted into the vapor cell 18, as was discussed in the case of the infrared mode of operation.

An additional mode of operation should be mentioned. It has a more limited tuning range but is useful for certain applications requiring higher power. Only laser 2 is needed. With reference to FIG. 5, $f_P$ is set equal to $f_L$ and the resulting four-wave mixing process produces ultraviolet radiation with frequency $f_R$ equal to $2f_L$ minus $f_S$. The coherence length for this process is given by $$L_c = \frac{1}{2\left(\frac{\Delta n_R}{\lambda_R} + \frac{\Delta n_S}{\lambda_S} - \frac{2\Delta n_L}{\lambda_L}\right)} \quad (4)$$

and again, for maximum output, the denominator in Eq. (4) should be adjusted to be near zero. The ultraviolet radiation generated by this method utilizing only one pumping laser is only tunable to the extent determined by the width of the Raman intensity distribution in FIG. 4. For each $f_L$, phase matching can be achieved by the addition of another alkali metal vapor.

An analog of this one laser pump process is obtained by setting $f_P = f_S$ in the process depicted in FIG. 2. The output occurs at $f_R = f_L - 2f_S$. In the cases of the rubidium and potassium with energy levels given in FIGS. 2 and 3, $f_R$ falls in the visible region of the electromagnetic spectrum and is therefore of less interest since good visible sources (e.g., dye lasers) already exist.

A new system for generating continuously tunable narrow-band infrared or ultraviolet radiation has been devised. The infrared/ultraviolet radiation can be in the form of short pulses occurring at high repetition rates. Although the resonances of rubidium and potassium have been used as examples for implementing the invention, the resonances of other vapors can be used so as to extend the tunability of both the generated infrared and ultraviolet radiations.

What is claimed is:

1. A generator of coherent ultraviolet light comprising
   a first laser for producing a first beam of radiation at a first frequency $f_L$,
   a nonlinear material having a given energy state above ground level which is connected by a Raman-type process to the ground level, said material being transparent to ultraviolet light,
   means for directing said first beam into said material so as to create stimulated Raman scattering at a second frequency $f_S$ equal to the difference between the first frequency and that frequency corresponding to the energy difference between said given energy state and said ground level,
   a second laser for producing a beam at a third frequency $f_p$, frequency $f_p$ corresponding to a higher energy state than that energy state associated with frequency $f_L$, and
   means for directing said first frequency and third frequency beams into said material whereby all said frequencies mix together to produce a fourth frequency $f_R$ in the ultraviolet region, whereby $f_R = f_p + f_L - f_S$.

2. A generator of coherent ultraviolet light comprising
   a first tunable laser for producing a first beam of radiation at a first frequency $f_L$,
   a nonlinear material having a given energy state above ground level which is connected by a Raman-type process to the ground level, said material being transparent to ultraviolet light,
   means for directing said first beam into said material so as to create stimulated Raman scattering at a second frequency $f_S$ equal to the difference between the first frequency and that frequency corresponding to the energy difference between said given energy state and said ground level,
   a second tunable laser for producing a beam at a third frequency $f_p$, frequency $f_p$ corresponding to a higher energy state than that energy state associated with frequency $f_L$, and
   means for directing said first frequency and third frequency beams into said material whereby all said frequencies mix together to produce a fourth frequency $f_R$ in the ultraviolet region, whereby $f_R = f_p + f_L - f_S$.

3. The generator of claim 2 wherein a second material is added to said nonlinear material so as to provide phase matching.

4. The generator of claim 1 wherein said nonlinear material is an alkali metal vapor.

* * * * *